US006587749B2

(12) United States Patent
Matsumoto

(10) Patent No.: US 6,587,749 B2
(45) Date of Patent: Jul. 1, 2003

(54) INDUSTRIAL ROBOT AND METHOD OF OPERATING SAME

(75) Inventor: Kazunori Matsumoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/816,671

(22) Filed: Mar. 26, 2001

(65) Prior Publication Data

US 2001/0035728 A1 Nov. 1, 2001

(30) Foreign Application Priority Data

Mar. 28, 2000 (JP) ...................................... 2000-088024

(51) Int. Cl.$^7$ ............................................. G06F 19/00
(52) U.S. Cl. ....................... 700/245; 700/256; 700/264; 318/568.1; 318/568.13; 318/568.24; 74/490.01; 74/490.02; 701/23
(58) Field of Search ................................. 700/245, 256, 700/264; 318/568.1, 568.13, 563, 568.11, 568.24; 74/490.01, 490.02; 701/23

(56) References Cited

U.S. PATENT DOCUMENTS

| | | | | |
|---|---|---|---|---|
| 4,553,077 A | * | 11/1985 | Brantmark et al. | 318/568.13 |
| 4,757,180 A | * | 7/1988 | Kainz et al. | 219/137.2 |
| 4,888,708 A | * | 12/1989 | Brantmark et al. | 700/264 |
| 5,191,271 A | * | 3/1993 | Hobmaier | 318/568.1 |
| 5,437,207 A | * | 8/1995 | Zimmer | 74/490.02 |
| 5,608,619 A | * | 3/1997 | Brantmark et al. | 700/264 |
| 5,751,918 A | * | 5/1998 | Shimogama et al. | 700/264 |
| 6,131,436 A | * | 10/2000 | O'Bannon et al. | 73/7 |
| 6,134,102 A | * | 10/2000 | Worn et al. | 361/680 |
| 6,145,403 A | * | 11/2000 | Aschenbrenner et al. | 74/490.01 |
| 6,356,806 B1 | * | 3/2002 | Grob et al. | 700/245 |
| 6,362,813 B1 | * | 3/2002 | Worn et al. | 345/169 |

FOREIGN PATENT DOCUMENTS

| | | | |
|---|---|---|---|
| DE | 40 15 644 A1 | * | 11/1990 |
| DE | 33 22 221 A1 | * | 1/1994 |
| EP | 0 673 726 A2 | * | 3/1995 |
| EP | 1 011 035 A2 | * | 6/2000 |
| JP | 6-304886 | | 11/1994 |
| WO | WO 97/04370 | * | 2/1997 |
| WO | WO 98/28632 | * | 7/1998 |

OTHER PUBLICATIONS

Bals et al., Industrial robot control– Control design engineering, 1997, Internet, p. 1.*
Scneider, Control technology for industrial robots, 1998, Internet pp. 1–9.*
Van et al., An interdisciplinary laboratory for teacing artificial intelligence adn manufacturing, 2000, Internet, pp. 1–8.*
Economou et al., Robust vibration suppession in flexible playloads carried by robot manipulators using digital filtering of joint trajectories, 2000, Internet, pp. 244–249.*
KUKA, Production monitoring and process control robotic measurement of Car body $ sub assy's sheet metal parts plastic components, no date, Advertisement, pp. 1–2.*

* cited by examiner

Primary Examiner—William A Cuchlinski, Jr.
Assistant Examiner—McDieunel Marc
(74) Attorney, Agent, or Firm—McDermott, Will & Emery

(57) ABSTRACT

It is possible to obtain an industrial robot which assures excellent reduction in maintenance. The industrial robot includes a robot body, a manipulator to control the operation of the robot body, a control device to control the manipulator, a first path disposed between the manipulator and the control device, and a second path between a commercial power source and the manipulator. Since the voltage supplied from the commercial power source in the second path is applied to the manipulator, the robot body becomes freely movable without being controlled by the manipulator.

18 Claims, 2 Drawing Sheets

INDUSTRIAL ROBOT AND METHOD OF OPERATING SAME

FIELD OF THE INVENTION

The present invention relates to an industrial robot and a method of operating the industrial robot.

BACKGROUND OF THE INVENTION

In recent years, the improvement of maintenance has been increasingly demanded with respect to industrial robots.

Generally, a driving motor for industrial robots is equipped with a holding brake for holding the robot position when the power supply is turned off.

The configuration of a conventional robot will be described in the following with reference to FIG. 2.

FIG. 2 shows a configuration of a prior art industrial robot. An industrial robot of conventional type comprises a control device 11, hand control unit 15, manipulator 12, cable 13, and connector 14. The cable 13 connects the manipulator 12 and the control device 11.

By using the hand control unit 15 of the control device 11, the robot can be operated to change its position.

However, when the operator is unable to operate the robot by using the control device 11 as the control device 11 is in alarm mode, the control device 11 is not supplied with power, or the manipulator 12 is not connected to the control device 11, the following two methods have been commonly employed to operate the robot.

One of the methods is such that the cable 13 which connects the manipulator 12 and the control device 11 of the robot is first disconnected, and after that, a voltage for releasing the holding brake is applied to the connector 14 connected to the holding brake, thereby releasing the holding brake. The other method is such that a means (a switch or the like) for releasing the holding brake is operated to release the holding brake. However, in these methods, it is generally required that the manipulator 12 be connected to the control device 11 and also that the control device 11 be supplied with power.

The means (a switch or the like) for releasing the holding brake is installed in the control device 11 or manipulator 12. Manual releasing of a holding brake of such motor is one of the regulation items specified in some of the safety standards.

A method of releasing a holding brake of a driving motor for such prior art industrial robot involves the following problems.

In case the cable 13 which connects the manipulator 12 and the control device 11 of the robot is disconnected, and a voltage for releasing the holding brake is applied to the connector 14 connected to the holding brake, then it is necessary to separately prepare a power supply to generate the voltage for releasing the holding brake.

Further, similarly, in case the cable 13 which connects the manipulator 12 and the control device 11 of the robot is disconnected, and a voltage for releasing the holding brake is applied to the connector 14 connected to the holding brake, then it is necessary to disconnect the cable 13 and also to retrieve the pin number of connector 14 connected to the holding brake. Accordingly, it is not easy to release the holding brake.

Furthermore, when a means (a switch or the like) for releasing the holding brake is operated, it is absolutely required that the control device 11 be supplied with power. That is, in case the control device 11 is not supplied with power just after installation of the robot, and in case the manipulator 12 is not connected to the control device 11, then it is difficult to change the position of the robot.

The present invention provides an industrial robot which can meet the requirement for easier maintenance.

SUMMARY OF THE INVENTION

An industrial robot in an embodiment of the present invention comprises:
(a) a robot body;
(b) a manipulator to control the operation of the robot body;
(c) a control device to control the manipulator;
(d) a first path disposed between the manipulator and the control device; and
(e) a second path disposed between a commercial power source and the manipulator.

Preferably, the voltage supplied from the commercial power source in the second path is applied to the manipulator, and then the robot body becomes freely movable without being controlled by the manipulator.

A method of operating an industrial robot of the present invention comprises:
(a) a step of feeding a robot system, wherein the robot system comprises
  a robot body,
  a manipulator to control the operation of the robot body,
  a control device to control the manipulator,
  a first path disposed between the manipulator and the control device, and
  a second path disposed between a commercial power source and the manipulator;
(b) a step of operating the manipulator by controlling the control device by the first path, thereby controlling the operation of the robot body; and
(c) a step of freely moving the robot body without being controlled by the manipulator, applying a voltage from the commercial power source to the manipulator when it is unable to control the control device by the first path.

With the above configuration, the robot position can be easily changed by applying a voltage from a commercial power source. As a result, an industrial robot which assures easier maintenance may be obtained.

DESCRIPTION OF THE REFERENCE NUMERALS

Figure 1:
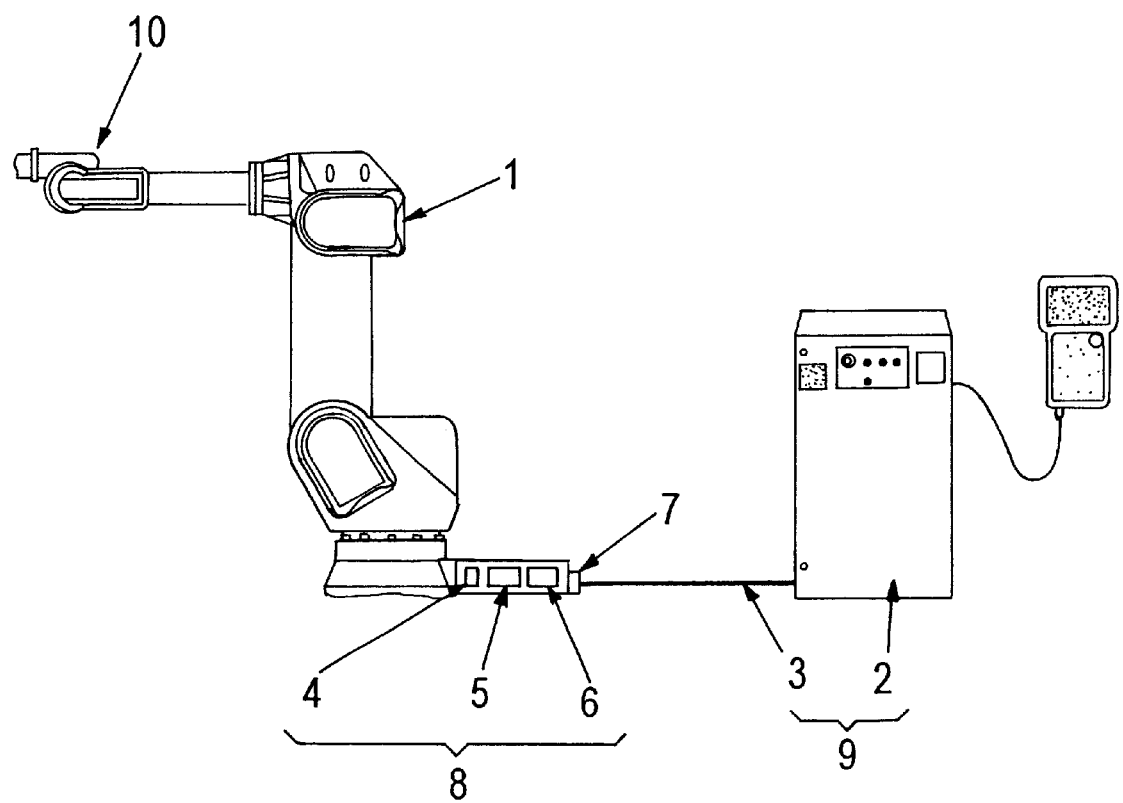
FIG. 1 shows a configuration of a robot in one embodiment of the present invention.
Figure 2:
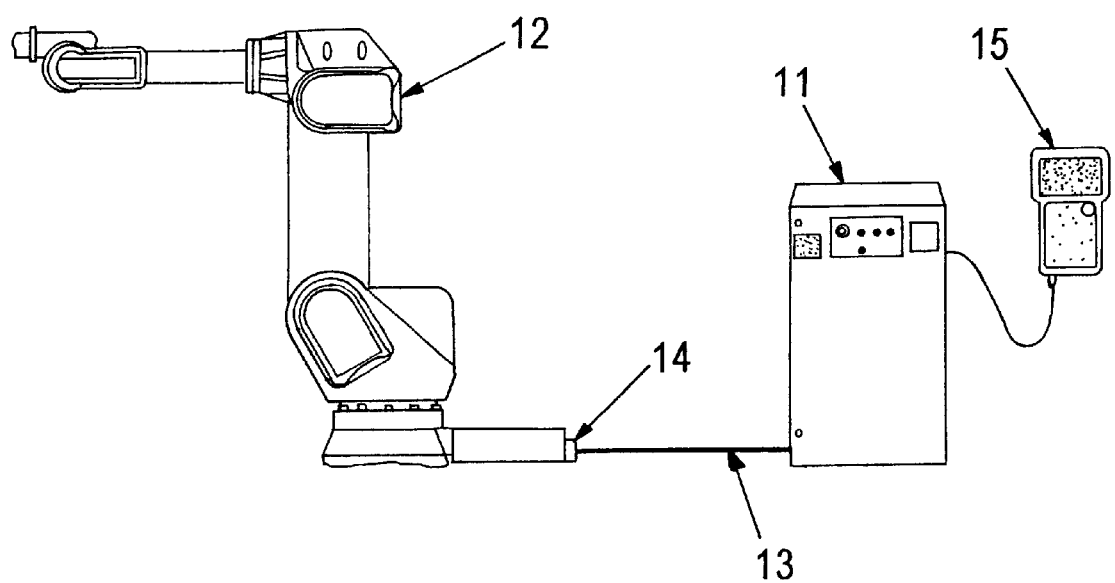
FIG. 2 shows a configuration of a conventional robot.

1 Manipulator
2 Control device
3 Cable (first path)
4 Voltage transformer for releasing holding brake
5 Terminal block
6 Switch
7 Connector
8 Second path
9 First path
10 Robot body

DETAILED DESCRIPTION OF THE INVENTION

An industrial robot in an embodiment of the present invention comprises:

(a) a robot body;
(b) a manipulator to control the operation of the robot body;
(c) a control device to control the manipulator;
(d) a first path disposed between the manipulator and the control device; and
(e) a second path disposed between a commercial power source and the manipulator.

Preferably, the voltage supplied from the commercial power source in the second path is applied to the manipulator, and then the robot body becomes freely movable without being controlled by the manipulator.

Preferably, the manipulator includes a motor to drive the robot body, and a brake to brake the motor, and
the motor has a function to drive the manipulator, and the brake has a function to brake the motor.

Preferably, the voltage supplied from the commercial power source in the second path is applied to the manipulator, thereby releasing the brake, and then the robot body becomes freely movable.

An industrial robot in another embodiment of the present invention comprises:

(a) a first path for releasing a brake which holds the driving motor of a manipulator according to the signal from a control device; and
(b) besides the first path, a second path connected to a commercial power source, wherein the second path has a function to release the brake.

Preferably, the commercial power source supplies a voltage to release the brake which holds the driving motor of the manipulator.

Preferably, the industrial robot further comprises (f) a voltage transformer disposed between the commercial power source and the manipulator in the second path. The voltage transformer serves a function to transform the voltage, supplied from the commercial power source, to a voltage for releasing the brake.

Preferably, the manipulator further comprises a brake releasing device to release the brake. When the brake is released, the robot body becomes freely movable.

Preferably, the industrial robot further comprises:

(g) a switch device disposed between the control device and the voltage transformer, and
the switch device serves to switch the first path, wherein
when the first path is switched on, the brake is controlled by the control device and becomes released, and
when the first path is switched off, the brake becomes released due to the voltage transformed by the voltage transformer in the second path.

Preferably, the second path is disposed so as to be freely connectable to the manipulator.

A method of operating an industrial robot of the present invention comprises:

(a) a step of feeding a robot system, wherein the robot system comprises
a robot body,
a manipulator to control the operation of the robot body,
a control device to control the manipulator,
a first path disposed between the manipulator and the control device, and
a second path disposed between a commercial power source and the manipulator;
(b) a step of operating the manipulator by controlling the control device by the first path, thereby controlling the operation of the robot body; and
(c) a step of freely moving the robot body without being controlled by the manipulator, applying a voltage from the commercial power source to the manipulator when it is unable to control the control device through the first path.

Preferably, the manipulator includes a motor to drive the robot body, and a brake to brake the motor;
the step (b) includes a step of controlling the control device by the first path, and operating the manipulator while holding the brake, thereby controlling the operation of the robot body; and
in the step (c), when it is unable to control the control device by the first path, a voltage is supplied from the commercial power source to the brake, thereby releasing the brake, and then the robot body becomes freely movable without being controlled by the manipulator.

Preferably, the robot system further comprises a voltage transformer disposed between the commercial power source in the first path and the manipulator, and
in the step (c), when it is unable to control the control device by the first path, the voltage supplied from the commercial power source is transformed by the voltage transformer to a voltage for releasing the brake, and the transformed voltage is applied to the brake, and then the robot body becomes freely movable without being controlled by the manipulator.

Preferably, the robot system comprises a switch device disposed between the control device and the manipulator, and
in the step (b), when the switch device switches the first path so that the first path is electrically connected to the manipulator, the brake is controlled by the control device and becomes released, and then the robot body becomes freely movable, and
in the step (c), when the switch device switches the first path so that the first path is switched off, the brake becomes released due to the voltage supplied from the commercial power source in the second path, and then the robot body becomes freely movable.

Preferably, the manipulator includes a brake releasing device to release the brake, and in the step (b) and step (c), the brake is released, and thereby, the robot body becomes freely movable.

With the above configuration, for changing the position of the robot, when a voltage is applied to release the brake of the driving motor for the manipulator, there is no need to provide a power source which generates a voltage to release the holding brake, and it is possible to easily change the robot position by using a commercial power source.

Also, since the commercial power source can be easily connected to the brake from outside, it is possible to easily release the brake without disconnecting the cable between the manipulator and the control device or retrieving the connector pin number.

Further, it is possible to change the robot position when the control device is not supplied with power and when the control device is not connected to the manipulator.

An exemplary embodiment of the present invention will be described in the following with reference to FIG. 1.

FIG. 1 is a configuration of an industrial robot in an exemplary embodiment of the present invention. In FIG. 1, the industrial robot comprises a robot body 10, manipulator 1, control device 2, cable 3, second path 8, switch device 6, and connector 7. The second path 8 includes a voltage transformer 4 and terminal device 5. The manipulator 1 includes a motor to drive the manipulator 1, and a brake to brake the motor.

The cable 3 connects the manipulator 1 to the control device 2. A first path 9 is formed by the cable 3 and the control device 2.

The voltage transformer 4 transforms the voltage of a commercial power source to a voltage for releasing the brake. The terminal device 5 is connected to the input of the voltage transformer 4. For example, a terminal block is used as the terminal device 5. The switch device 6 serves to switch the first path 9 which leads to the brake from the output of the voltage transformer 4. The first path 9 is normally in a state of being switched off.

When the first path 9 is switched on, the brake is controlled by the control device and becomes released. When the first path 9 is switched off, the brake becomes released due to the voltage transformed by the voltage transformer in the second path 8. For example, a switch is used as the switch device 6.

The first path 9 which releases the brake and the second path 8 connected to a commercial power source supplied to the control device 2 are connected to the cable 3 by the signal from the control device 2. The second path 8 is disposed separately from the first path 9.

The input of the voltage transformer 4 is connected to the second path 8.

The output of the voltage transformer 4 is connected to the brake via switch 6. Accordingly, the switch 6 is operated only when it is necessary to change the position of robot body 10.

The manipulator further comprises a brake releasing device to release the brake, and when the brake is released, the robot body becomes freely movable.

In an industrial robot having a configuration as described above, when the control device 2 is not connected to the manipulator 1 or when no power is supplied to the control device 2, the position of the robot can be changed, with a commercial power source connected to the terminal block 5, only by operating the switch 6.

As described above, when the control device is not connected to the manipulator or when no power is supplied to the control device, it is possible to easily change the robot position without removing the cable which connects the manipulator to the control device or without providing the connector leading to the brake with a power source to generate a voltage for releasing the brake or without retrieving the pin number of the connector leading to the brake.

What is claimed is:

1. An industrial robot, comprising:
   (a) a robot body;
   (b) a manipulator to control an operation of said robot body;
   (c) a control device to control said manipulator;
   (d) a first path disposed between said manipulator and said control device; and
   (e) a second path disposed between a commercial power source and said manipulator,
      wherein when a voltage supplied from said commercial power source in said second path is applied to said manipulator, said robot body becomes freely movable without being controlled by said manipulator.

2. The industrial robot of claim 1, wherein when a voltage supplied from said commercial power source in said second path is applied to said manipulator, said robot body becomes freely movable without being controlled by said manipulator.

3. The industrial robot of claim 2, wherein said second path is disposed so as to be freely connectable to said manipulator.

4. The industrial robot of claim 1,
   wherein said manipulator includes a motor to drive said robot body,
   a brake to brake the motor, and
   said motor has a function to drive said manipulator, and said brake has a function to brake said motor.

5. The industrial robot of claim 4, wherein when the voltage supplied from said commercial power source in said second path is applied to said manipulator, said brake is released, and said robot body becomes freely movable.

6. The industrial robot of claim 5, wherein said second path is disposed so as to be freely connectable to said manipulator.

7. The industrial robot of claim 4,
   wherein said manipulator further comprises a brake releasing divice to release said brake, and
   when said brake is released, said robot becomes freely movable.

8. The industrial robot of claim 7, wherein said second path is disposed so as to be freely connectable to said manipulator.

9. The industrial robot of claim 4, wherein said second path is disposed so as to be freely connectable to said manipulator.

10. The industrial robot of claim 1, further comprising:
    (f) a voltage transformer disposed between said commercial power source and said manipulator in said second path,
    wherein said voltage transformer serves to transform the voltage supplied from said commercial power source to a voltage for releasing said brake.

11. The industrial robot of claim 10, further comprising:
    (g) a switch device disposed between said control device and said voltage transformer,
    wherein said switch device serves to switch said first path, and when said first path is switched on, said brake is controlled by said control device, and
    when said first path is switched off, said brake becomes released due to the voltage transformed by said voltage transformer in said second path.

12. The industrial robot of claim 10, wherein said second path is disposed so as to be freely connectable to said manipulator.

13. The industrial robot of claim 1, wherein said second path is disposed so as to be freely connectable to said manipulator.

14. A method of operating an industrial robot having a robot system comprising a robot body;
    a manipulator to control the operation of said robot body;
    a control device to control said manipulator;
    a first path disposed between said manipulator and said control device, and a second path disposed between a commercial power source and said manipulator;
    said method comprising the steps of:
    (a) operating said manipulator by controlling said control device by said first path, thereby controlling the operation of said robot body; and (b) freely moving said robot body without being controlled by said manipulator by applying a voltage from said commercial power source to said manipulator via said second path when said manipulator is unable to be controlled by said control device via said first path.

15. The method of operating an industrial robot of claim 14, wherein said manipulator includes a motor to drive said robot body, and a brake to brake said motor;

the step (a) includes a step of controlling said control device by said first path, and operating said manipulator, while holding said brake, thereby controlling the operation of said robot body; and in the step (b), when said manipulator is unable to be controlled by said control device via said first path, a voltage is supplied from said commercial power source to said brake, thereby releasing said brake, and then said robot body becomes freely movable without being controlled by said manipulator.

16. The method of operating an industrial robot of claim 15, wherein said robot system further comprises a voltage transformer disposed between said commercial power source in said first path and said manipulator, and in the step (b), when said manipulator is unable to be controlled by said control device via said first path, the voltage supplied from said commercial power source is transformed by said voltage transformer to a voltage for releasing said brake, and the transformed voltage is applied to said brake, and then said robot body becomes freely movable without being controlled by said manipulator.

17. The method of operating an industrial robot of claim 15, wherein said robot system further comprises a switch device disposed between said control device and said manipulator;

in step (a), when said switch device selects said first path so that the first path is electrically connected to said manipulator, said brake is controlled by said control device and becomes released, and then said robot body becomes freely movable, and in step (b), when said switch device selects said second path so that the first path is switched off, said brake becomes released due to the voltage supplied from said commercial power source in said second path, and then said robot body becomes freely movable.

18. The method of operating an industrial robot of claim 15, wherein said manipulator further includes a brake releasing device to release said brake, and in the step (a) and step (b), said brake is released, and thereby, said robot body becomes freely movable.

* * * * *